US011985751B2

(12) United States Patent
Lei et al.

(10) Patent No.: US 11,985,751 B2
(45) Date of Patent: May 14, 2024

(54) INTELLIGENT LAMP, SIGNAL ADAPTIVE IDENTIFICATION METHOD THEREFOR, AND COMPUTER-READABLE STORAGE MEDIUM

(71) Applicant: ZHUHAI LTECH TECHNOLOGY CO., LTD, Zhuhai (CN)

(72) Inventors: Jianwen Lei, Zhuhai (CN); Long Wu, Zhuhai (CN); Zhongren Wu, Zhuhai (CN)

(73) Assignee: ZHUHAI LTECH TECHNOLOGY CO., LTD, Zhuhai (CN)

( * ) Notice: Subject to any disclaimer, the term of this patent is extended or adjusted under 35 U.S.C. 154(b) by 0 days.

(21) Appl. No.: 18/036,663

(22) PCT Filed: Dec. 7, 2020

(86) PCT No.: PCT/CN2020/134232
§ 371 (c)(1),
(2) Date: May 12, 2023

(87) PCT Pub. No.: WO2022/099834
PCT Pub. Date: May 19, 2022

(65) Prior Publication Data
US 2023/0397320 A1  Dec. 7, 2023

(30) Foreign Application Priority Data

Nov. 13, 2020  (CN) .......................... 202011265907.2

(51) Int. Cl.
*H05B 47/195* (2020.01)
(52) U.S. Cl.
CPC ................. *H05B 47/195* (2020.01)

(58) Field of Classification Search
CPC ......... G06K 9/00; H05B 47/19; H05B 47/195
See application file for complete search history.

(56) References Cited

U.S. PATENT DOCUMENTS

| 2013/0293155 A1 | 11/2013 | Campbell et al. |
| 2016/0219024 A1* | 7/2016 | Verzun ..................... H04L 9/34 |

FOREIGN PATENT DOCUMENTS

| CN | 103281224 A | 9/2013 |
| CN | 105865458 A | 8/2016 |
| CN | 112311420 A | 2/2021 |

OTHER PUBLICATIONS

Wang et al., English translation of CN-105865458-A, Aug. 17, 2016, pp. 1-8 (Year: 2016).*

* cited by examiner

*Primary Examiner* — Daniel D Chang
(74) *Attorney, Agent, or Firm* — Bayramoglu Law Offices LLC

(57) ABSTRACT

An intelligent lamp, a signal adaptive identification method for the intelligent lamp, and a computer-readable storage medium for implementing the method include: receiving a communication signal, and obtaining frame header data of the communication signal; and comparing the frame header data with preset reference frame header data, and if the frame header data matches the preset reference frame header data, obtaining communication data of a communication signal corresponding to the frame header data, and determining whether a time sequence of the communication data matches a communication data time sequence corresponding to the reference frame header data, and if yes, executing an instruction in the communication data of the communication signal corresponding to the frame header data.

12 Claims, 4 Drawing Sheets

INTELLIGENT LAMP, SIGNAL ADAPTIVE IDENTIFICATION METHOD THEREFOR, AND COMPUTER-READABLE STORAGE MEDIUM

CROSS-REFERENCES TO THE RELATED APPLICATIONS

This application is the national phase entry of International Application No. PCT/CN2020/134232, filed on Dec. 7, 2020, which is based upon and claims priority to Chinese Patent Application No. 202011265907.2, filed on Nov. 13, 2020, the entire contents of which are incorporated herein by reference.

TECHNICAL FIELD

The present invention relates to the field of intelligent lamp control technologies, and more particularly, to a signal adaptive identification method for an intelligent lamp, an intelligent lamp for realizing the method, and a computer-readable storage medium.

BACKGROUND

With the development of smart house technologies, current household appliances are becoming increasingly more intelligent, and an intelligent lamp is a common intelligent appliance. To implement intelligent control over a lamp, most of existing intelligent lamps are integrated with a wireless communication module, for example, a Wi-Fi module, a Bluetooth module, or an infrared module is disposed, and a user controls the intelligent lamp through wireless communication by using a terminal device such as a smartphone.

Because the intelligent lamp can receive multiple types of communication signals, such as DALI, DMX, and AD, to implement compatibility of the intelligent lamp, a receiving module for multiple types of communication signals is usually disposed in the intelligent lamp. In this way, the intelligent lamp can receive multiple types of communication signals, and the user can select any type of communication signal as required, to transmit a control instruction. Therefore, some intelligent lamps need to be able to switch between multiple types of communication signals, that is, the intelligent lamp currently receives a communication signal of type A, and needs to switch to receive a communication signal of type B at a next moment. Therefore, a mechanism for switching communication signal types needs to be set for the intelligent lamp.

Currently, there are approximately two manners for switching between multiple types of communication signals: manual switching and automatic switching. The manual switching manner is simple in technical implementation, but in a process of installing the intelligent lamp, additional manpower is required to perform adjustment based on an on-site environment. In addition, when this manner is applied to a product, an additional hole needs to be disposed on a housing, and some apparatuses for manually switching a communication signal type need to be added to an inner side of the product. This not only increases production costs of the intelligent lamp, but also has adverse impact on the appearance and beauty of the intelligent lamp.

The automatic switching manner can resolve the problems of the manual switching manner. In the automatic switching manner, frame header data of a communication signal is identified, for example, a type of the communication signal is determined based on a level of a beginning segment of the communication signal. However, this manner also has some disadvantages, for example, there is a long period of idle waiting time in a switching process, and in this period of time, the intelligent lamp cannot be effectively operated, and even in some scenarios, switching fails occasionally, and even an unknown state in the switching process occurs. This affects the use of the intelligent lamp.

In addition, in an existing automatic switching manner, if the type of the communication signal is identified only by using the frame header data, an identification error is prone to occur. For example, when frame header data of two types of communication signals are close, an identification error is prone to occur, and consequently, communication data cannot be correctly identified, and the intelligent lamp cannot be effectively controlled.

Some existing intelligent lamps receive specific types of communication signals, but to be compatible with multiple types of communication signals, a signal parsing circuit that can parse multiple different types of signals is usually disposed in the intelligent lamp. Therefore, after receiving the communication signal, the intelligent lamp needs to parse the received communication signal and identify the communication signal. Currently, a method for identifying a communication signal is mainly based on frame header data of the communication signal, and a time sequence of the communication data is not used as a basis for identification, resulting in an identification error of a type of the communication signal.

Technical Problem

A first objective of the present invention is to provide a signal adaptive identification method of an intelligent lamp for improving accuracy of automatic switching of communication signals for an intelligent lamp.

A second objective of the present invention is to provide an intelligent lamp for implementing the foregoing signal adaptive identification method for an intelligent lamp.

A third objective of the present invention is to provide a computer-readable storage medium for implementing the foregoing signal adaptive identification method for an intelligent lamp.

Technical Solution

To implement the first objective of the present invention, a signal adaptive identification method for an intelligent lamp provided in the present invention includes: receiving a communication signal, and obtaining frame header data of the communication signal; and comparing the frame header data with preset reference frame header data, and if the frame header data matches the preset reference frame header data, obtaining communication data of a communication signal corresponding to the frame header data, and determining whether a time sequence of the communication data matches a communication data time sequence corresponding to the reference frame header data, and if yes, executing an instruction in the communication data of the communication signal corresponding to the frame header data.

To implement the second objective of the present invention, an intelligent lamp provided in the present invention includes at least two signal receiving ports, where each signal receiving port is connected to one signal parsing circuit, a signal of one signal parsing circuit is output to a processor, and when executing a computer program, the processor implements the foregoing signal adaptive identification method for an intelligent lamp.

The signal adaptive identification method for an intelligent lamp provided in the present invention may alternatively be: receiving at least two communication signals, obtaining frame header data of each communication signal, and adding the frame header data of each communication signal to a frame header data list; comparing each piece of frame header data in the frame header data list with preset reference frame header data to find target frame header data that matches the reference frame header data; and obtaining communication data of a communication signal corresponding to the target frame header data, determining whether a time sequence of the communication data matches a communication data time sequence corresponding to the reference frame header data, and if yes, switching a current communication signal type to a communication signal type corresponding to the target frame header data.

A preferable solution is: if the time sequence of the communication data of the communication signal corresponding to the target frame header data does not match the communication data time sequence corresponding to the reference frame header data, removing the target frame header data from the frame header data list.

A further solution is: before the current communication signal type is switched to the communication signal type corresponding to the target frame header data, further backing up data of the received communication signal.

An even further solution is: after the current communication signal type is switched to the communication signal type corresponding to the target frame header data, executing an instruction in the communication data of the communication signal corresponding to the target frame header data.

An even further solution is: the executing an instruction in the communication data of the communication signal corresponding to the target frame header data includes: comparing a current instruction and an instruction obtained after switching, and performing a buffering operation based on the current instruction and the instruction obtained after switching.

An even further solution is: the intelligent lamp has a signal receiving port, and after receiving a communication signal, the signal receiving port sends the communication signal to a signal parsing circuit list, where the signal parsing circuit list includes at least two signal parsing circuits, multiple signal parsing circuits parse the communication signal in turn, and the frame header data is frame header data obtained after the multiple signal parsing circuits parse the communication signal.

An even further solution is: lengths of time used by the signal parsing circuits to parse the communication signal are equal or unequal.

To implement the foregoing second objective, an intelligent lamp provided in the present invention includes a signal receiving port, the signal receiving port is connected to a signal parsing circuit list, the signal parsing circuit list includes at least two signal parsing circuits, a signal of the signal parsing circuit list is output to a processor, and when executing a computer program, the processor implements the foregoing signal adaptive identification method for an intelligent lamp.

To implement the foregoing third objective, the present invention provides a computer-readable storage medium storing a computer program, and when the computer program is executed by a processor, the steps of the foregoing signal adaptive identification method for an intelligent lamp are implemented.

Beneficial Effects

According to the method in the present invention, after frame header data is compared, time sequences of communication data are further compared, and an instruction in communication data of a communication signal is executed only when the frame header data matches and the time sequences of the communication data match, so that a type of the communication signal is identified. In this way, a problem of inaccurate identification of the type of the communication signal caused when only the frame header data is compared can be avoided, the accuracy of identification of the type of the communication data is improved, it is ensured that the intelligent lamp can correctly parse the communication data, a correct control instruction is obtained, and it is further ensured that the intelligent lamp is correctly controlled.

Moreover, if a time sequence of communication data corresponding to a target frame header data is incorrect, the frame header data is interference data, and the interference data is deleted from a frame header list, so that the interference data can be effectively cleaned, thereby improving the accuracy of identifying the communication signal by the intelligent lamp.

Further, once an error occurs during identification of the type of the communication signal, the communication signal can be re-identified by using backed-up data, and the communication signal can be identified for a second time by using an error correction mechanism when an error occurs during identification of the communication signal, thereby improving the accuracy of identification of the communication signal.

In addition, after the type of the communication signal is switched, the communication signal further needs to be parsed based on a newly identified communication signal type, and a corresponding instruction is executed, to ensure that the intelligent lamp is correctly controlled.

Because an instruction corresponding to the new communication signal and an original instruction cause a sudden change in an operating state of the intelligent lamp, for example, luminance and chromaticity of the intelligent lamp may suddenly change, if the instruction is directly executed, a user may feel uncomfortable, and therefore, uncomfortableness of the user can be avoided through a buffering operation.

Further, multiple signal parsing circuits are disposed in the intelligent lamp, so that multiple types of communication signals can be parsed, and it is possible to ensure through polling that the communication signals can be parsed by each signal parsing circuit, thereby improving the accuracy of identification of the communication signal type.

In addition, because frame header data of different types of communication signals have different lengths, lengths of time used by different signal parsing circuits to identify the communication signal are different. Therefore, time for identifying the communication signal can be shortened while it is ensured that the communication signal can be correctly identified.

The present invention is further described in detail below with reference to the accompanying drawings and embodiments.

DETAILED DESCRIPTION OF EMBODIMENTS

According to the signal adaptive identification method for an intelligent lamp in the present invention, the intelligent lamp can receive a wireless signal such as a Bluetooth signal, an infrared signal, or a Wi-Fi signal, and can also receive DALI, DMX, AD, or a wireless radio frequency signal. Preferably, a processor and a memory are disposed on the intelligent lamp. The memory stores a computer program, and the processor executes the computer program to implement the foregoing signal adaptive identification method for an intelligent lamp.

Figure 1:
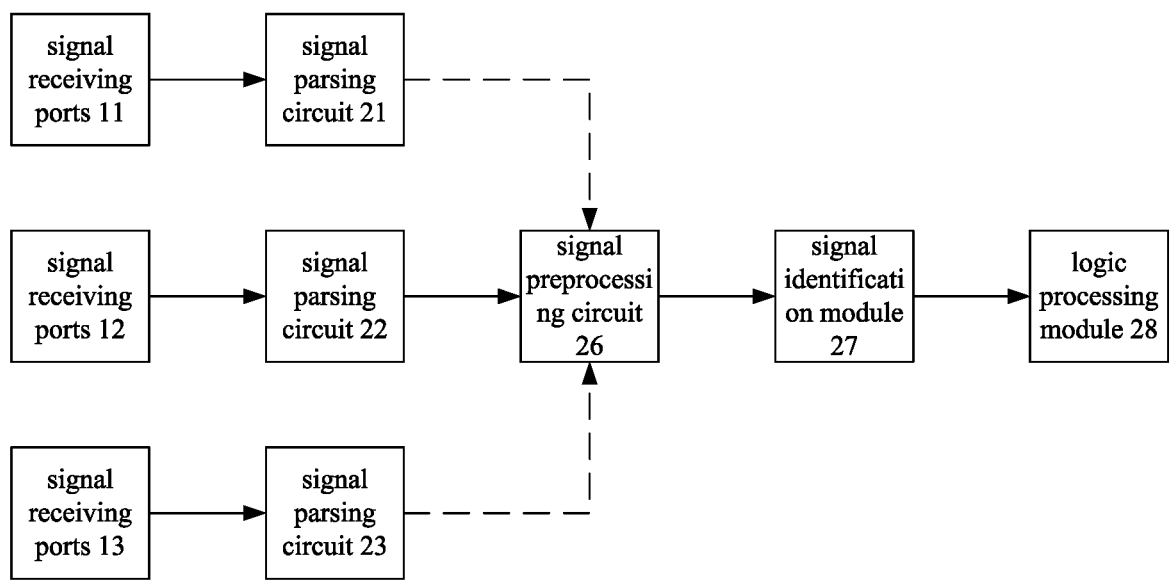
FIG. 1 is a schematic diagram of an electrical connection of a first embodiment of an intelligent lamp according to the present invention.

First embodiment of an intelligent lamp and a signal adaptive identification method therefor:

As shown in FIG. 1, the intelligent lamp includes multiple signal receiving ports, for example, signal receiving ports 11, 12, and 13. Each of the signal receiving ports 11, 12, and 13 corresponds to one signal parsing circuit, for example, the signal receiving port 11 outputs a signal to a signal parsing circuit 21, the signal receiving port 12 outputs a signal to a signal parsing circuit 22, and the signal receiving port 13 outputs a signal to a signal parsing circuit 23. Multiple signal parsing circuits output parsed signals to a signal preprocessing circuit 26, the signal preprocessing circuit 26 outputs a signal to a signal identification module 27, and the signal identification module 27 outputs a signal to a logic processing module 28. Preferably, both the signal identification module 27 and the logic processing module 28 are internal modules of a processor, for example, modules implemented by a computer program of the processor. Therefore, in this embodiment, a signal output by only one signal parsing circuit is transmitted to the processor.

In this embodiment, each signal receiving port corresponds to one type of signal, such as DALI, DMX, or a key signal. This embodiment is mainly for a case that a signal type is clear; in other words, when the intelligent lamp is delivered from a factory, a type of a communication signal received by the intelligent lamp has already be set. Therefore, only one signal parsing circuit is connected to the signal preprocessing circuit 26. For example, a switching component is disposed between each signal parsing circuit and the signal preprocessing circuit 26. When on/off of each switching component is controlled by a gating signal, after the type of the communication signal of the intelligent lamp is determined, a signal parsing circuit corresponding to the communication signal may be connected to the signal preprocessing circuit 26, and a signal output by the signal parsing circuit is received by the signal preprocessing circuit.

Figure 2:
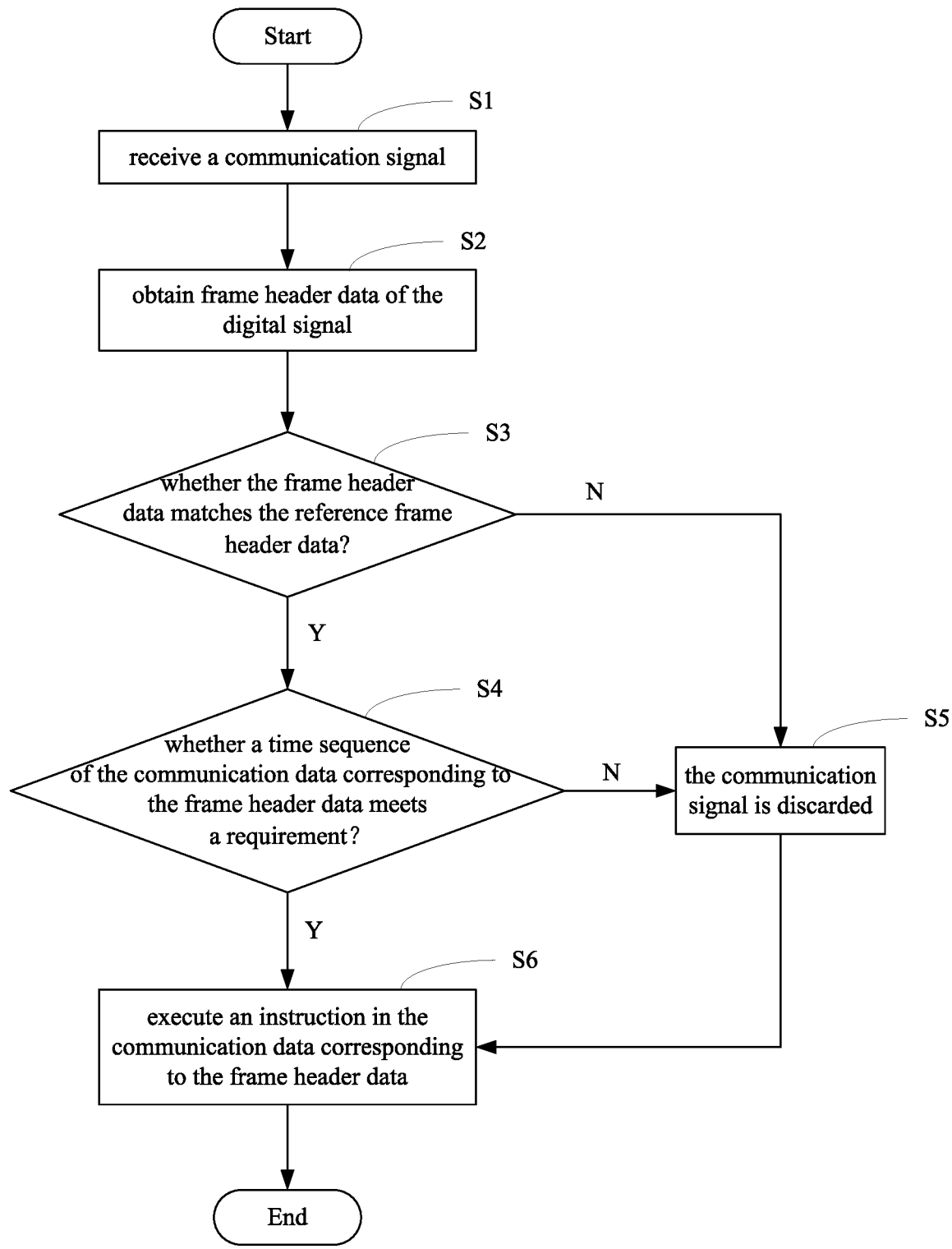
FIG. 2 is a flowchart of a first embodiment of a signal adaptive identification method for an intelligent lamp according to the present invention.

A procedure of the signal adaptive identification method is described below with reference to FIG. 2. First, step S1 is performed: Receive a communication signal. For example, one of the signal receiving ports receives the communication signal. For example, the signal receiving port 12 receives the communication signal and sends the received communication signal to the signal parsing circuit 22 after receiving the communication signal. The signal parsing circuit 22 parses the received communication signal to obtain a group of digital signals. After being preprocessed, for example, filtered, by the signal preprocessing circuit, the digital signals are sent to the signal identification module 27, and the signal identification module 27 identifies the group of digital signals.

Then, step S2 is performed: Obtain frame header data of the digital signal. Because frame header data of the digital signal obtained after different types of communication signals are parsed has their own characteristics, for example, start and end locations of a frame header are represented by specific values, the frame header data of the digital signal can be identified based on the specific values.

Then, reference frame header data is obtained. In this embodiment, multiple pieces of reference frame header data are pre-stored. Preferably, the multiple pieces of reference frame header data form a reference frame header data list, and the reference frame header data list includes the multiple pieces of reference frame header data. The reference frame header data is preset frame header data for each particular communication signal standard. Further, in the reference frame header data list, each type of communication signal includes at least three pieces of reference frame header data, that is, the same reference frame header data appears at least three times in the reference frame header data list.

Step S3 is performed: Determine whether the frame header data matches the reference frame header data, that is, compare the frame header data with each piece of reference frame header data in the reference frame header data list, to find frame header data that matches one piece of reference frame header data in the reference frame header data list. In the reference frame header data list, each piece of reference frame header data appears at least three times. In this way, the frame header data is compared with the same reference frame header data at least three times. In this way, if a comparison result in a specific time is incorrect, comparison results in at least two other times may be correct. In this way, the accuracy of comparing the frame header data can be improved.

If the frame header data matches one piece of reference frame header data, step S4 is performed: Obtain communication data corresponding to the frame header data, and determine whether a time sequence of the communication data of the communication signal corresponding to the frame header data meets a requirement. Because data corresponding to a communication signal includes frame header data and communication data, the communication data includes a control instruction for the intelligent lamp, and communication data of each type of communication signal has its own time sequence. After the communication data of the communication signal corresponding to the frame header data is obtained, it is further necessary to determine whether the time sequence of the communication data of the communication signal corresponding to the frame header data meets the requirement, that is, it is determined whether the time sequence of the communication data corresponding to the frame header data is the same as a communication data time sequence corresponding to the matched reference frame header data. If the time sequence of the communication data corresponding to the frame header data is the same as the communication data time sequence corresponding to the matched reference frame header data, it can be determined that the frame header data and the found reference frame header data are communication signals of a same type, and step S6 needs to be performed. If a determining result in step S4 is no, it indicates that the frame header data and the found reference frame header data are not communication signals of a same type, and the frame header data may be considered as an interference signal. In this case, step S5 is performed, and the communication signal is discarded.

Certainly, in step S3, if the frame header data does not match any piece of reference frame header data in the reference frame header data list, the frame header data may be considered as interference data, or the signal preprocessing circuit 26 is connected to a wrong signal parsing circuit. In this case, step S5 is performed, and the communication signal is discarded. Further, when step S5 is performed, prompt information is also sent to indicate that frame header data of a currently received communication signal does not match the reference frame header data.

Certainly, because the signal preprocessing circuit 26 is connected to a specific signal parsing circuit, during obtaining of the reference frame header data, only frame header data of a communication signal of a specific type may be obtained. In step S3, only the frame header data of the received communication signal is compared with the frame header data of the communication signal of the specific type. In step S4, a time sequence of communication data of a current communication signal is compared with a time sequence of communication data of the communication signal of the specific type.

Figure 3:
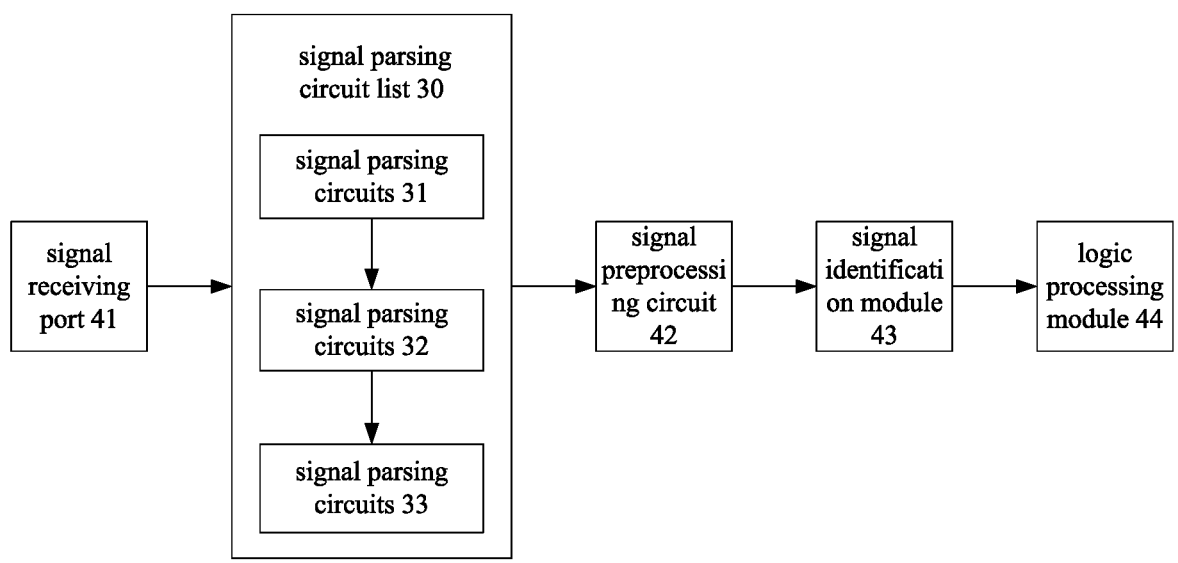
FIG. 3 is a schematic diagram of an electrical connection of a second embodiment of an intelligent lamp according to the present invention.

Second embodiment of an intelligent lamp and a signal adaptive identification method therefor:

As shown in FIG. 3, an intelligent lamp includes a signal receiving port 41, a signal parsing circuit list 30, a signal preprocessing circuit 42, a signal identification module 43, and a logic processing module 44. In this embodiment, there is one signal receiving port 41; multiple signal parsing circuits are disposed in the signal parsing circuit list 30, including signal parsing circuits 31, 32, 33, and the like; and each signal parsing circuit can parse one type of communication signal, for example, separately parse DALI, DMX, or a key signal.

The signal receiving port 41 outputs a signal to the signal parsing circuit list 30. After receiving the signal, the signal parsing circuit list 30 sends the received signal to multiple signal parsing circuits in turn. The multiple signal parsing circuits parse received communication signals through polling, and send parsed signals to the signal preprocessing circuit 42. The signal preprocessing circuit 42 outputs a signal to the signal identification module 43. The signal identification module 43 outputs a signal to the logic processing module 44. Preferably, both the signal identification module 43 and the logic processing module 44 are internal modules of a processor, for example, modules implemented by a computer program of the processor.

In addition, a single-pole multi-throw switching component may be disposed in the signal parsing circuit list 30, for example, a single-pole three-throw switching component is disposed. Three signal input ends of the switching component are each connected to one of the signal parsing circuits 31, 32, and 33, that is, one signal input end is connected to one signal parsing circuit. A signal output end of the single-pole three-throw switching component is connected to the signal preprocessing circuit 42, so that the signal preprocessing circuit 42 receives, at one moment by controlling gating of multiple channels of the single-pole three-throw switching component, a signal output by only one signal parsing circuit. In this way, by controlling to turn on the three signal input ends of the single-pole three-throw switching component in turn, the three signal parsing circuits poll the communication signal received by the signal receiving port 41.

Figure 4:
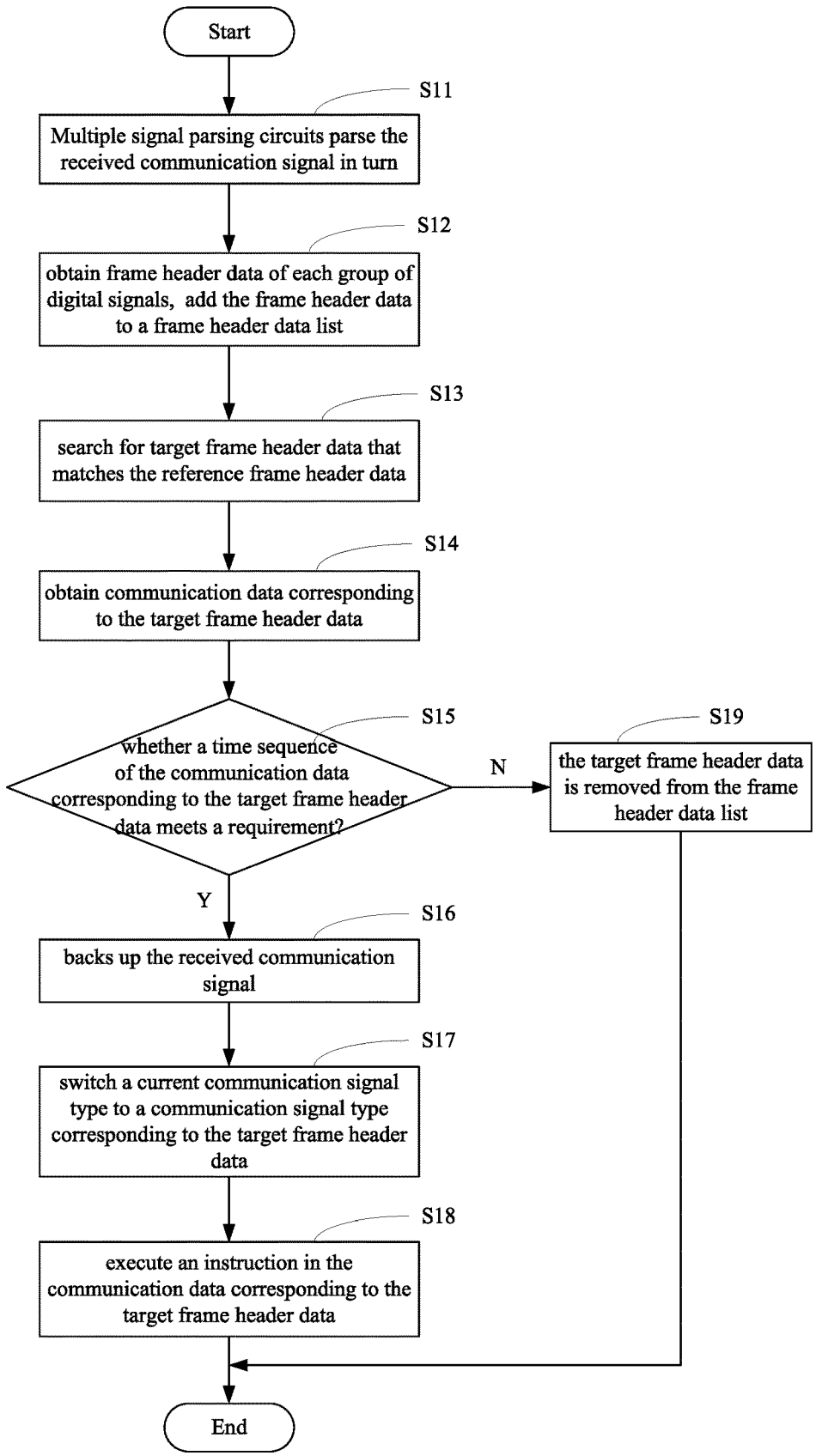
FIG. 4 is a flowchart of a second embodiment of a signal adaptive identification method for an intelligent lamp according to the present invention.

A procedure of the signal adaptive identification method is described below with reference to FIG. 4. First, the signal receiving port receives a communication signal and sends the received communication signal to the signal parsing circuit list, and the signal parsing circuit list performs step S11: Multiple signal parsing circuits parse the received communication signal in turn. Specifically, in a first time period, the single-pole three-throw switching component is controlled to gate the signal parsing circuit 31, and the signal parsing circuit 31 parses the received communication signal, and sends a parsed signal to the signal preprocessing circuit 42; in a second time period, the single-pole three-throw switching component is controlled to gate the signal parsing circuit 32, and the signal parsing circuit 32 parses the received communication signal, and sends a parsed signal to the signal preprocessing circuit 42; and in a third time period, the single-pole three-throw switching component is controlled to gate the signal parsing circuit 33, and the signal parsing circuit 33 parses the received communication signal, and sends a parsed signal to the signal preprocessing circuit 42. Preferably, lengths of the first time period, the second time period, and the third time period may be equal or unequal, for example, parsing time lengths of different types of signals are different. A length of time in which each signal parsing circuit is gated may be determined based on the parsing time lengths of different types of signals. In this way, while it is ensured that each signal parsing circuit can parse the communication signal, time for waiting for parsing of the communication signal can be effectively shortened, and the efficiency of adaptive signal switching can be improved.

After the communication signal is parsed by the multiple signal parsing circuits, a group of digital signals are obtained. After being preprocessed, for example, filtered, by the signal preprocessing circuit, the digital signals are sent to the signal identification module 43, and the signal identification module 43 identifies the group of digital signals. Therefore, step S12 needs to be performed: Obtain frame header data of each group of digital signals, and add the frame header data to a frame header data list. Because frame header data of each group of digital signals has their own characteristics, for example, start and end locations of a frame header are represented by specific values, the frame header data of each group of digital signals can be identified based on the specific values, and the obtained frame header data is added to the frame header data list.

Then, reference frame header data is obtained. In this embodiment, multiple pieces of reference frame header data are pre-stored. Preferably, the multiple pieces of reference frame header data form a reference frame header data list, and the reference frame header data list includes the multiple pieces of reference frame header data. The reference frame header data is preset frame header data for each particular communication signal standard. Further, in the reference frame header data list, each type of communication signal includes at least three pieces of reference frame header data, that is, the same reference frame header data appears at least three times in the reference frame header data list.

Then, step S13 is performed: Search for target frame header data that matches the reference frame header data, that is, compare each piece of frame header data in the frame header data list with each piece of reference frame header data in the reference frame header data list, to find frame header data that matches one piece of reference frame header data in the reference frame header data list, where the found frame header data is the target frame header data.

In the reference frame header data list, each piece of reference frame header data appears at least three times. In this way, each piece of frame header data is compared with the same reference frame header data at least three times. In this way, if a comparison result in a specific time is incorrect, comparison results in at least two other times may be correct. In this way, accuracy of comparing the target frame header data can be improved.

After the target frame header data is obtained, step S14 is performed: Obtain communication data corresponding to the target frame header data. Because data corresponding to a communication signal includes frame header data and communication data, the communication data includes a control instruction for the intelligent lamp, and communication data of each type of communication signal has its own time sequence. After communication data of a communication signal corresponding to the target frame header data is obtained, step S15 is further performed: Determine whether a time sequence of the communication data of the communication signal corresponding to the target frame header data meets a requirement, that is, determine whether the time sequence of the communication data corresponding to the target frame header data is the same as a communication data time sequence corresponding to the matched reference frame header data. If the time sequence of the communication data corresponding to the target frame header data is the same as is the same as the communication data time sequence corresponding to the matched reference frame header data, it can be determined that the target frame header data and the reference frame header data found in step S13 are communication signals of a same type, and step S16 needs to be performed. If a determining result in step S15 is no, it indicates that the target frame header data and the found reference frame header data are not communication signals of a same type, and the target frame header data may be considered as an interference signal. In this case, step S19 is performed, and the target frame header data is removed from the frame header data list.

In step S16, the processor backs up the received communication signal, and the backed-up data may include communication signals received in a previous period of time, and further includes a currently received communication signal. Then, step S17 is performed: Switch a current communication signal type to a communication signal type corresponding to the target frame header data. Because it can be determined through step 15 that the currently received communication signal is a new type of communication signal, step S17 is performed to switch the communication signal type.

Finally, step S18 is performed: Execute an instruction in the communication data corresponding to the target frame header data. Because the communication data generally includes an instruction for controlling the intelligent lamp, for example, changing an operating state of the intelligent lamp, for example, adjusting luminance or chromaticity of the intelligent lamp, after a type of the currently received communication signal is determined, it is also necessary to parse the communication signal based on the current communication signal type, obtain a corresponding instruction, and perform an operation corresponding to the instruction.

Generally, a current operating state of the intelligent lamp is different from an adjusted operating state. When a new instruction is executed, a sudden change in the operating state of the intelligent lamp may be caused, and a user feels uncomfortable. Therefore, it is necessary to compare a current instruction with an instruction obtained after switching, and perform a buffering operation according to the current instruction and the instruction obtained after switching, for example, perform gradient processing on the switching of luminance or chromaticity and motor control, to avoid discomfort caused to the user by the direct execution of the instruction obtained after switching.

The identification of the communication signal type in this embodiment is not based on whether or not the frame header data matches the reference frame header data only, and whether or not the time sequence of the communication data corresponding to the frame header data is consistent with the time sequence of the communication data corresponding to the reference frame header data is further taken into consideration. A change in the current communication signal type is confirmed only when the two time sequences are consistent. Otherwise, the current frame header data is considered as interference data, and the frame header data is removed from the frame header data list. In this way, the accuracy of the identification of the communication signal type can be improved.

It should be noted that a processor and a memory are disposed in the intelligent lamp. The memory stores a computer program that can run on the processor, and when executing the computer program, the steps of the foregoing signal adaptive identification method for an intelligent lamp are implemented. For example, the computer program may be segmented into one or more modules, and the one or more modules are stored in the memory and are executed by the processor to implement the various modules in the present invention. The one or more modules may be a series of computer program instruction segments capable of performing a particular function, and the instruction segments are used to describe an execution process of the computer program in a terminal device.

The processor in the present invention may be a central processing unit (CPU), or may be another general-purpose processor, a digital signal processor (DSP), an application specific integrated circuit (ASIC), a field-programmable gate array (FPGA), another programmable logic device, a discrete gate, a transistor logic device, a discrete hardware component, or the like. The general purpose processor may be a microprocessor, or the processor may be any conventional processor or the like. The processor is a control center of the terminal device, and connects parts of the entire terminal device by using various interfaces and lines.

The memory may be used to store a computer program and/or module, and the processor may implement various functions of the terminal device by running or executing the computer program and/or module stored in the memory and invoking data stored in the memory. The memory may mainly include a program storage area and a data storage area. The program storage area may store an operating system, an application program required by at least one function (such as a sound playback function or an image playback function), and the like. The data storage area may store data (such as audio data or an address book) created based on use of a mobile phone, and the like. In addition, the memory may include a high-speed random access memory, and may include a non-volatile memory such as a hard disk, a memory, a plug-in hard disk, a smart media card (Smart Media Card, SMC), a secure digital (Secure Digital, SD) card, a flash card (Flash Card), at least one magnetic disk storage device, a flash memory device, or another volatile solid state storage device.

Embodiment of a computer-readable storage medium:

When the computer program stored in the foregoing computer apparatus is implemented in a form of a software functional unit and sold or used as an independent product, the computer program may be stored in a computer-readable storage medium. Based on such an understanding, all or some procedures of the method in the foregoing embodiments are implemented in the present invention, and may also be implemented by a computer program by instructing related hardware. The computer program may be stored in a computer-readable storage medium, and when the computer program is executed by a processor, the steps of the signal adaptive identification method for an intelligent lamp may be implemented.

The computer program includes computer program code, and the computer program code may be in a form of source code, object code, or an executable file, or some intermediate forms. The computer-readable medium may include any entity or apparatus capable of carrying the computer program code, a recording medium, a USB flash disk, a removable hard disk, a magnetic disk, an optical disk, a computer memory, a read-only memory (ROM), a random access memory (RAM), an electric carrier wave signal, a telecommunication signal, a software distribution medium, and the like. It should be noted that content of the computer-readable medium may be properly increased or decreased in accordance with the requirements of legislation and patent practice within jurisdictions. For example, in some jurisdictions, the computer-readable medium does not include an electric carrier signal or a telecommunications signal in accordance with legislation and patent practice.

Finally, it should be emphasized that the present invention is not limited to the foregoing embodiments, such as a change in the identified type of the communication signal, or a change in a quantity of signal parsing circuits. These changes should also be included within the scope of the present invention as claimed.

INDUSTRIAL APPLICABILITY

The method in the present invention can be applied to intelligent control over an intelligent lamp, so that the intelligent lamp can adapt to various signals of different types, the accuracy of recognizing a signal of the intelligent lamp can be improved, and a case that the intelligent lamp cannot work normally due to incorrect identification of a signal type is avoided.

What is claimed is:

1. A signal adaptive identification method for an intelligent lamp, comprising:
   receiving a communication signal, and obtaining frame header data of the communication signal; and
   comparing the frame header data with preset reference frame header data, and if the frame header data matches the preset reference frame header data, obtaining communication data of the communication signal corresponding to the frame header data, and determining whether a time sequence of the communication data matches a communication data time sequence corresponding to the preset reference frame header data, and if yes, executing an instruction in the communication data of the communication signal corresponding to the frame header data.

2. An intelligent lamp, comprising:
   at least two signal receiving ports, wherein each signal receiving port is connected to one signal parsing circuit, a signal of the signal parsing circuit is output to a processor, and when executing a computer program, the processor implements the signal adaptive identification method for the intelligent lamp according to claim 1.

3. A signal adaptive identification method for an intelligent lamp, comprising:
   receiving at least two communication signals, obtaining frame header data of each communication signal, and adding the frame header data of each communication signal to a frame header data list;
   comparing each piece of frame header data in the frame header data list with preset reference frame header data to find target frame header data that matches the preset reference frame header data; and
   obtaining communication data of a communication signal corresponding to the target frame header data, determining whether a time sequence of the communication data matches a communication data time sequence corresponding to the preset reference frame header data, and if yes, switching a current communication signal type to a communication signal type corresponding to the target frame header data.

4. The signal adaptive identification method for the intelligent lamp according to claim 3, wherein
   if the time sequence of the communication data of the communication signal corresponding to the target frame header data does not match the communication data time sequence corresponding to the preset reference frame header data, the target frame header data is removed from the frame header data list.

5. The signal adaptive identification method for the intelligent lamp according to claim 3, wherein
   before the current communication signal type is switched to the communication signal type corresponding to the target frame header data, data of the received communication signal is backed up.

6. The signal adaptive identification method for the intelligent lamp according to claim 3, wherein
   after the current communication signal type is switched to the communication signal type corresponding to the target frame header data, an instruction in the communication data of the communication signal corresponding to the target frame header data is executed.

7. The signal adaptive identification method for the intelligent lamp according to claim 6, wherein
   the executing of the instruction in the communication data of the communication signal corresponding to the target frame header data comprises: comparing a current instruction and an instruction obtained after switching, and performing a buffering operation based on the current instruction and the instruction Obtained after switching.

8. The signal adaptive identification method for the intelligent lamp according to claim 3 wherein
   the intelligent lamp has a signal receiving port, and after receiving a communication signal, the signal receiving port sends the communication signal to a signal parsing circuit list, wherein the signal parsing circuit list comprises at least two signal parsing circuits, multiple signal parsing circuits parse the communication signal in turn, and the frame header data is frame header data obtained after the multiple signal parsing circuits parse the communication signal.

9. The signal adaptive identification method for the intelligent lamp according to claim 8, wherein
   lengths of time used by the signal parsing circuits to parse the communication signal are equal or unequal.

10. An intelligent lamp, comprising:
a signal receiving port, wherein the signal receiving port is connected to a signal parsing circuit list, the signal parsing circuit list comprises at least two signal parsing circuits, a signal of the signal parsing circuit list is output to a processor, and when executing a computer program, the processor implements the signal adaptive identification method for an intelligent lamp according to claim 3.

11. A non-transitory computer-readable storage medium storing a computer program, wherein when the computer program is executed by a processor, the steps of the signal adaptive identification method for an intelligent lamp according to claim 1 are implemented.

12. A non-transitory computer-readable storage medium storing a computer program, wherein when the computer program is executed by a processor, the steps of the signal adaptive identification method for an intelligent lamp according to claim 3 are implemented.

\* \* \* \* \*